J. FRITZ.
GRAIN SHOCKER.
APPLICATION FILED APR. 9, 1909.

1,008,596.

Patented Nov. 14, 1911.
7 SHEETS—SHEET 3.

Witnesses
E. J. Stewart
E. Llands

Inventor
Julius Fritz.
By C. A. Snow & Co.
Attorneys

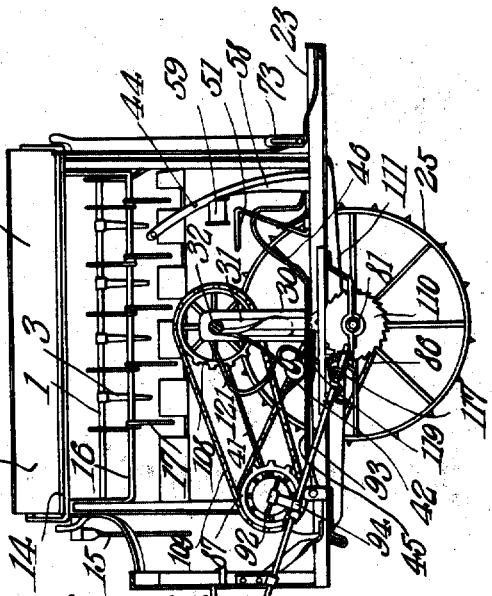

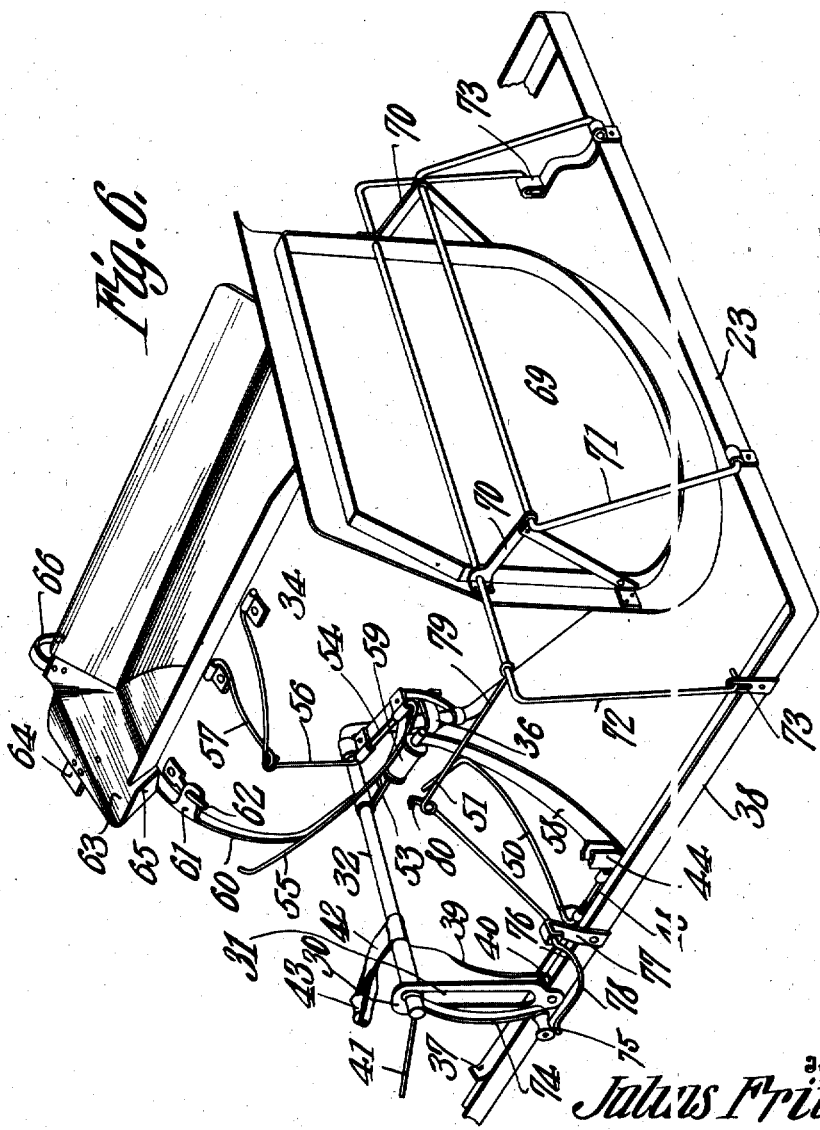

J. FRITZ.
GRAIN SHOCKER.
APPLICATION FILED APR. 9, 1909.
1,008,596.
Patented Nov. 14, 1911.
7 SHEETS—SHEET 6.
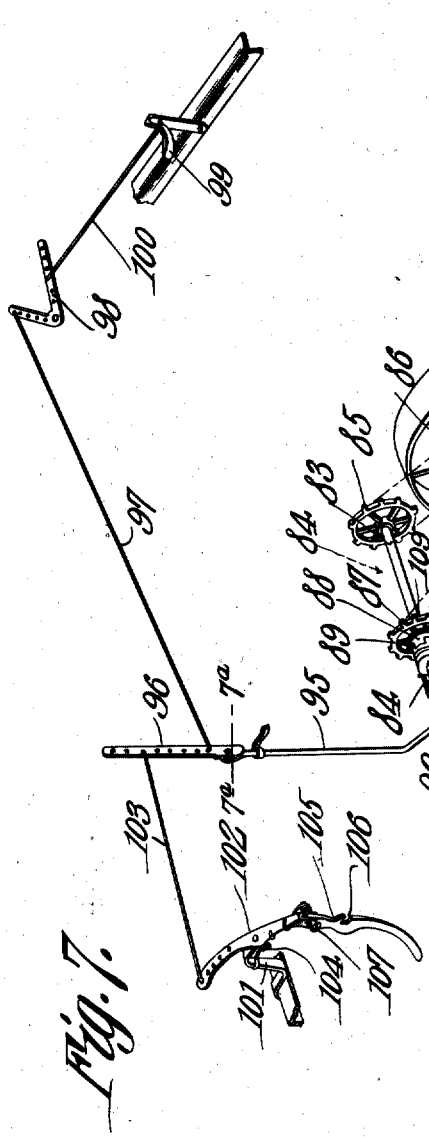
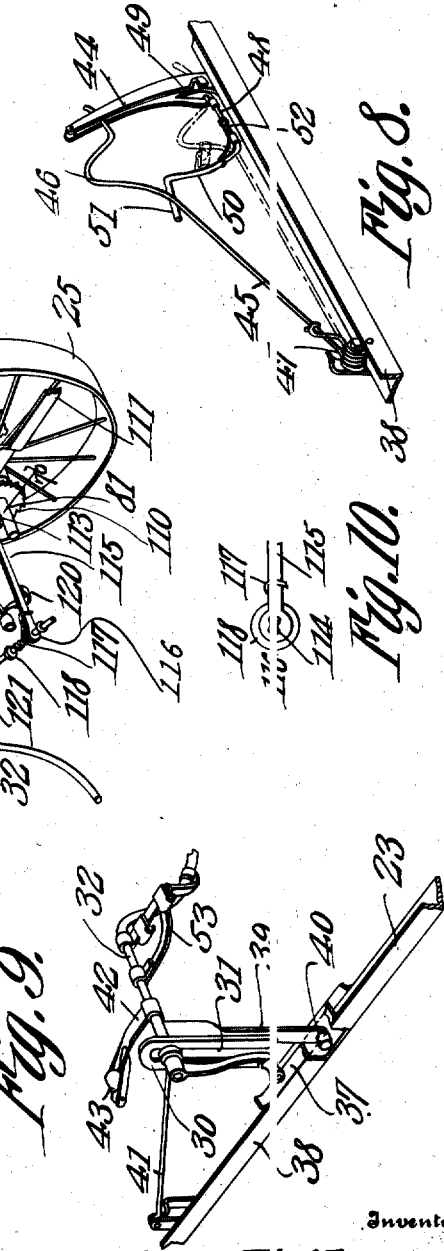
Inventor
Julius Fritz.

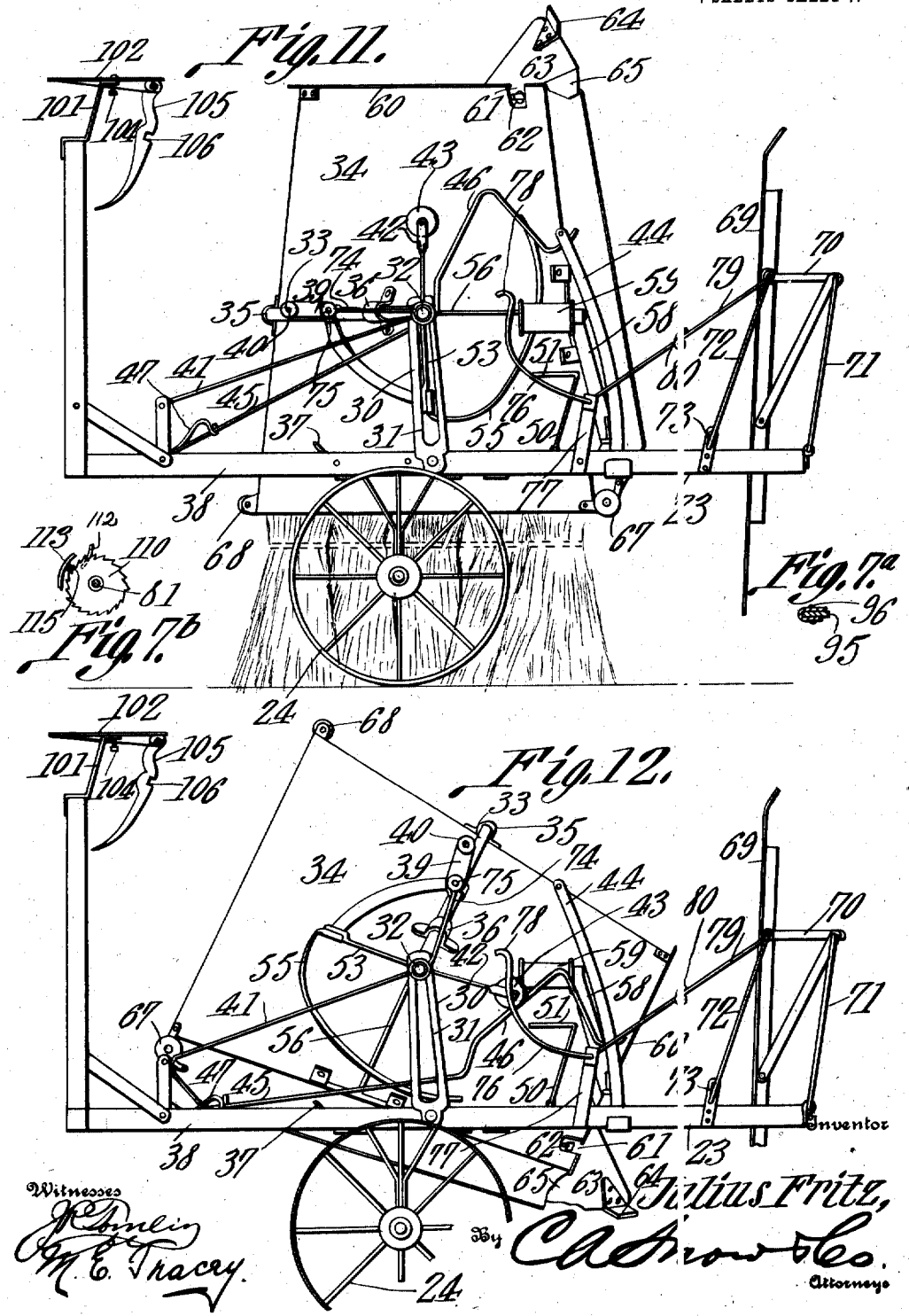

UNITED STATES PATENT OFFICE.

JULIUS FRITZ, OF NEWARK, SOUTH DAKOTA.

GRAIN-SHOCKER.

1,008,596. Specification of Letters Patent. Patented Nov. 14, 1911.

Application filed April 9, 1909. Serial No. 488,899.

*To all whom it may concern:*

Be it known that I, JULIUS FRITZ, a citizen of the United States, residing at Newark, in the county of Marshall and State of South Dakota, have invented a new and useful Grain-Shocker, of which the following is a specification.

This invention has relation to grain shockers and it consists in the novel construction and arrangement of its parts, as hereinafter shown and described.

The object of the invention is to provide a grain shocker in the form of an attachment adapted to be applied to the frame of a harvester for receiving sheaves or bundles from the grain deck thereof and assembling the same in the form of a shock; means being provided whereby when sufficient sheaves have been collected to form a shock for depositing them in upright position upon the ground in shock formation.

With the above general object in view the submitted invention includes means for delivering the sheaves or bundles to a shock receptacle, and when deposited therein in providing means for compacting the sheaves or compressing the bundle together in close relation prior to depositing the assembled bundle upon the ground in shock form.

The present invention also includes means for returning the parts adapted to handle the sheaves or bundles as above indicated and for positioning the shocks upon the ground, to their normal positions.

The attachment is adapted to be pivotally connected with the frame of a harvester, and draft means may be provided in addition to that with which the harvester is equipped, for the purpose of propelling the shocker and relieving the harvester of tendency toward side draft by reason of the application of the attachment as indicated.

The several parts of the attachment are actuated by power derived from the main traction wheel of the harvester (commonly known as the "bull wheel"), and also from a traction wheel which serves in part as a support for the attachment.

Figure 1:
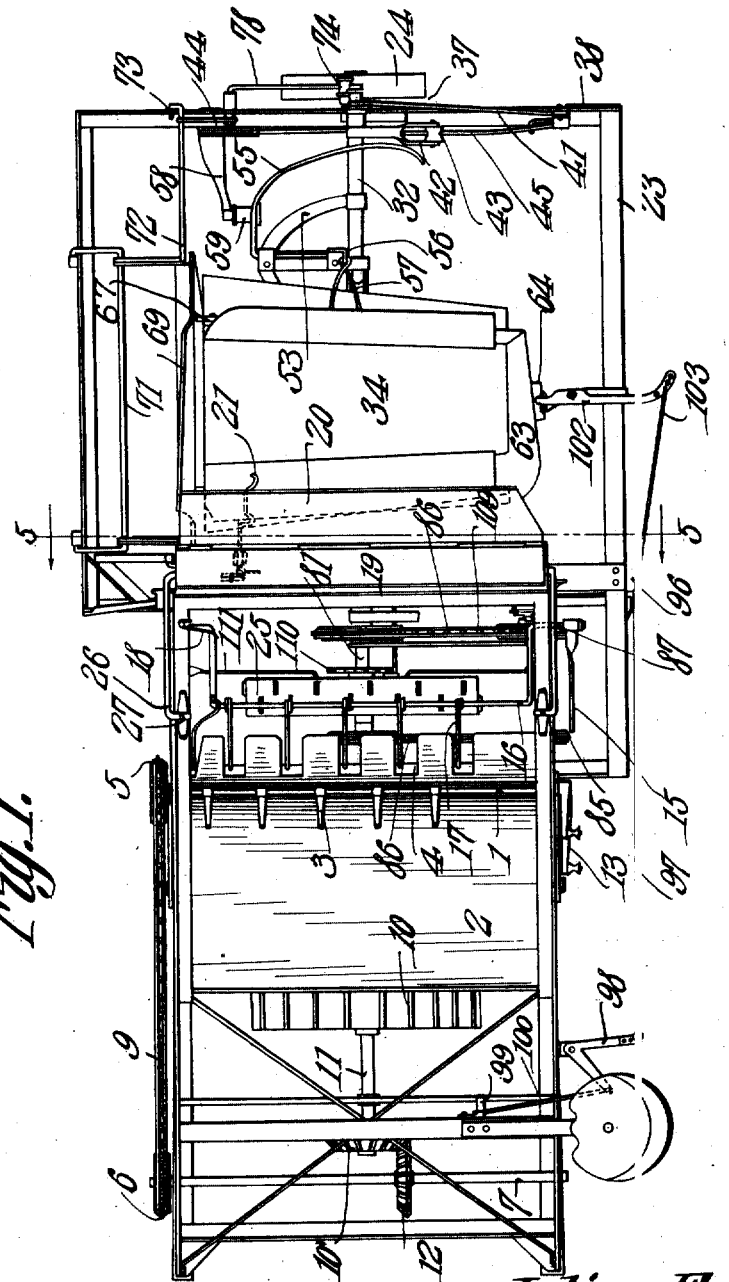
Figure 2:
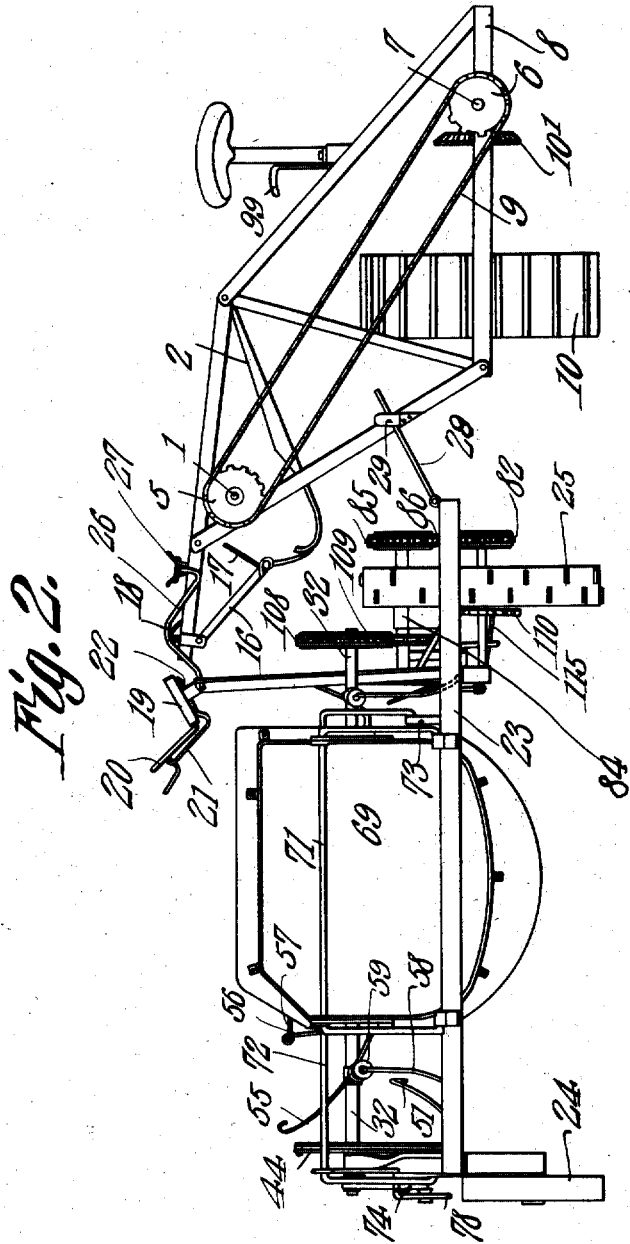
Figure 3:
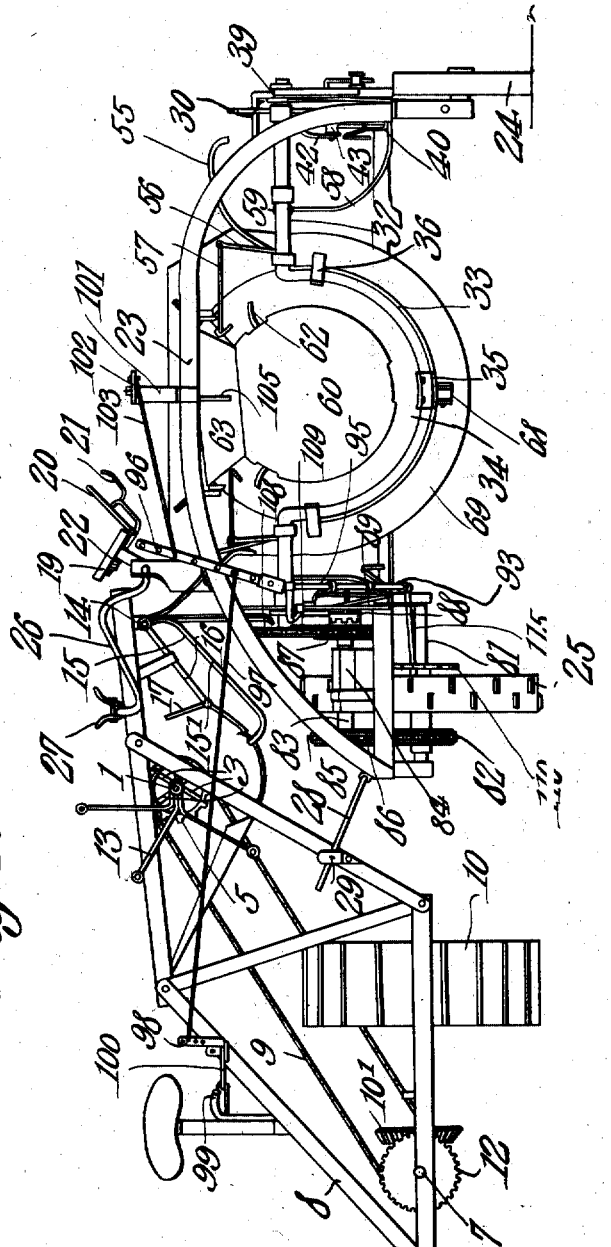

In the accompanying drawings:—Figure 1 is a top plan view of the grain shocker attached to the grain deck of a harvester. Fig. 2 is a front end elevation of the same. Fig. 3 is a rear end elevation of the same. Fig. 4 is a side elevation of the grain shocker. Fig. 5 is a longitudinal sectional view of the grain shocker cut on the line 5—5 of Fig. 1. Fig. 6 is a perspective view of the bundle receptacle and adjacent parts. Fig. 7 is a perspective view of means for rotating the bundle receptacle-supporting shaft. Fig. 7ª is a transverse sectional view of parts of the grain shocker cut on the line 7ª—7ª of Fig. 7. Fig. 7ᵇ is a side elevation of a ratchet wheel and adjacent parts viewing the same from the line 7ᵇ in Fig. 7 of the drawings and showing adjacent parts in section. Fig. 8 is a perspective view of a spring-actuated arm used in the shocker. Fig. 9 is a perspective view of an end portion of the bundle-receptacle-supporting shaft. Fig. 10 is a transverse sectional view of a shaft used upon the shocker. Fig. 11 is a side elevation of the shock receptacle of the shocker showing the same in dumping position. Fig. 12 is a side elevation of the said shock receptacle showing the same turning from dumping position to bundle-receiving position.

As an auxiliary to the attachment above referred to a shaft 1 is journaled for rotation in the frame of a harvester above the delivery end of the grain deck 2 thereof and is provided along its length with a series of spaced fingers 3. The delivery end of the deck 2 is provided with a series of recesses 4. A sprocket wheel 5 is mounted upon the forward end of the shaft 1, and a sprocket wheel 6 is mounted upon the forward end of a shaft 7 which is journaled upon the frame 8 of the harvester. A sprocket chain 9 passes around the sprocket wheels 5 and 6 and is adapted to transmit rotary movement from the said wheel 6 to the wheel 5, and through the said wheel to the shaft 1. The main traction wheel 10 (commonly known as the "bull wheel") is provided with a concentrically laterally disposed shaft 11, which extends under or within the frame 8 of the harvester. A beveled pinion 10' is fixed to the inner end of the shaft 11, and meshes with a beveled pinion 12, mounted upon the shaft 7. Thus it is seen that means is provided for transmitting rotary movement from the main traction wheel 10 of the harvester to the shaft 1, mentioned in the beginning of the specific description of the auxiliary appliances in connection with the invention, of which a specific description is to follow. It will also be seen that the parts are so arranged and mounted that, while the main traction wheel 10 rotates in a forward direction as the harvester moves over a field, the shaft 1 is so rotated that the fingers 3 carried thereby move down along the grain deck 2 toward the incisions or recesses 4 provided at the end thereof, and then move up over the shaft 1, so that they engage bundles or sheaves as they roll down the said deck.

A series of spaced arms 13 are mounted upon that end of the shaft 1 opposite the end thereof upon which the sprocket wheel 5 is mounted, and the said arms are approximately radially disposed with relation to the said supporting shaft 1. A shaft 14 is journaled for rotation at the outer portion of the frame 8 of the harvester, and is provided at one end with a series of spaced arms 15. Of the said arms 15 the first (designated as 15') has its lower end normally lying in the path of movement of one of the arms 13 upon the shaft 1, and as the said arm 15' is swung when the arm 13 comes in contact with the same (in a manner hereinafter to be described) the shaft 14 is partially rotated, and the succeeding arms 15 are brought into the path of movement of the succeeding arms 13 upon the shaft 1. The shaft 14 is provided with an intermediate crank portion 16, upon which is mounted fingers 17. The said fingers have opposite end portions extending at opposite sides of the said crank portion 16 and disposed at an angle to each other; thus the said fingers form a cradle. The inner extremities of the fingers 17 are adapted to pass through the spaces provided between the fingers 3 mounted upon the shaft 1, and, inasmuch as the opposite end portions of the said fingers 17 are angularly disposed, a bundle or sheaf which is lifted by the fingers 3 upon the shaft 1 will be deposited upon the fingers 17 in the manner hereinafter to be described. A spring 18 is mounted upon the upper outer portion of the frame 8 of the harvester and is provided with an end which projects into the path of movement of the crank portion 16 of the shaft 14. A trough 19 is also mounted upon the upper outer portion of the frame 8 of the shocker and is located below the path of movement of the fingers 17. That is to say, the said trough is so positioned as to receive from the cradle formed by said fingers a sheaf or bundle as the crank portion 16 of the shaft 14 moves toward the trough. A hinged apron 20 forms a side of the trough 19 and is held in an inclined position with relation to the fixed portion of the said trough by means of an arm 21, which is journaled to the under side of the fixed portion of the trough 19, and which, at its free end portion, bears against the under side of the hinged apron 20. A spring 22 is connected with that portion of the arm 21 which is located under the fixed portion of the trough 19, and is under tension with a tendency to hold the free end of the said arm in an elevated position, whereby the hinged apron 20 is afforded a support which retains the said hinged apron in the inclined position with relation to the fixed portion of the trough 19 as above indicated. However when a bundle is deposited in the trough 19 the apron 20 swings down under the weight of the bundle and serves as a skid to direct the bundle to a bundle receptacle to be described. When free of the bundle the apron is forced back to its normal position by the arm 21 and spring 22. Thus the apron 20 serves to break the fall of the bundle from the delivery fingers 17 to the bundle-receptacle, and also by reason of the fact that the bundle engages the apron 20 before it enters the receptacle, the bundle is positioned in an approximately horizontal position before it is permitted to fall into the receptacle. It has heretofore been stated that the said trough 19 is attached to the outer portion of the frame 8 of the harvester, but this need not necessarily be the case, as the said trough may be located at any point between the point of delivery of the fingers carried by the shaft 14 and the receiving portion of a bundle-receptacle, hereinafter to be described. It therefore follows that the said trough may be mounted upon the frame of the harvester or upon the frame proper of the shocker attachment, and in the present instance it is illustrated as being shown upon the frame of the attachment.

The shocker attachment consists of a frame 23, which is supported at one side upon a ground wheel 24, and at its opposite or inner side upon a traction wheel 25. Links 26 are pivotally connected with the upper portion of the frame 23, at one end, and at their opposite ends are pivotally connected with bearings 27 mounted upon the outer portion of the frame 8 of the harvester. A guide 28 is pivotally connected with the lower portion of the frame 23, and slidably engages a cleat 29 mounted upon the frame 8 of the harvester. While the links 26 have pivotal connection with the frames of the harvester and shocker respectively, the guide 28 is pivotally connected with the frame of the shocker and slidably engages the frame of the harvester. Therefore it will be seen that as the harvester passes over the surface of the ground and the shocker is attached thereto, by reason of the peculiar connection between the frame of the shocker and the frame of the harvester, a certain amount of flexibility in a lateral direction is provided, inasmuch as the guide 28 is not positively connected with the frame of the harvester. Therefore, the harvester and the attachments may pass over uneven ground, and, while the harvester is moving in a straight forward direction, the shocker is compelled to move with the same, but should either the harvester or the shocker tilt laterally, such tilting movement is compensated for by reason of the fact that the link 28 may slide with relation to the harvester frame.

Vertically disposed guides 30 are mounted upon the side portions of the frame 23 and are provided with elongated openings 31. A shaft 32 is journaled at its end portions in the elongated openings 31 of the said guides 30, and is provided at an intermediate point with a crank portion 33. A bundle-receptacle 34 is mounted in the crank portion 33 and is preferably formed of sheet metal material, the sides of which are flexible, and the said receptacle is maintained in position upon the crank portion 33 of the shaft 32 by means of a clip 35, attached to the lower portion of the receptacle and which passes around the said crank portion 33, and at its sides by means of guides 36, which are attached at their ends to the side portions of the said receptacle and loosely receive the end portions of the crank portion of the shaft 32.

Guides 37 are mounted upon the side rails 38 of the frame 23, and arms 39 are fixed to the end portions of the shaft 32 and extend down along the guides 30. Rollers 40 are journaled at the lower ends of the arms 39 and are located under the guides 37. The end portions of the shaft 32 project through the elongated openings 31 in the guides 30, and as the shaft 32 is rotated, as will be hereinafter explained, its end portions move vertically along the elongated openings 31 in the guides 30. Thus, as the shaft 32 rotates, it moves bodily at the same time, and it is during such movement that the accumulated bundles are deposited upon the ground in the form of a shock, as will be hereinafter explained. A wire link 41 is pivoted at its forward end to the outer end portion of the shaft 32, and the rear end of the said link 41 is pivotally attached to the outer side rail 38 of the frame 23. Arms 42 are also fixed to the end portions of the shaft 32, and the said arms, at their outer extremities are provided with journaled rollers 43. The arms 42 project from the axis of the shaft 32 at approximately right angles to the arms 39.

Guides 44 are fixed to the side rails 38 of the frame 23, and arms 45 are pivotally attached at their rear ends to the side rails 38 of the said frame. The forward ends of the arms 45 enter the guides 44 and said arms 45 are provided, at points intermediate of their ends, with inclined sections 46. Springs 47 have contact with the rear end portions of the said arms 45, and are under tension with a tendency to hold the forward ends of the arms in elevated positions in the guides 44. Shafts 48 are journaled upon the side rails 38 of the frame 23, and are provided with catch ends 49 which normally lie in the paths of movement of the forward ends of the arms 45. The shafts 48 are provided with laterally disposed sections 50 which merge into sections 51, which extend in the same general direction as the major or body portion of the said shafts 48. Coil springs 52 surround the shafts 48 and bear upon the same. Said springs 52 are under tension with a tendency to hold the catch extremities 49 of the shafts 48 in the path of movement of the forward end portions of the arms 45. Brackets 53 are located upon the end portions of the shaft 32 which join with the intermediate curved portion 33 thereof. Spring members 54 are journaled upon the brackets 53 and are provided with curved end portions 55. At their opposite end portions the said members 54 merge into the upstanding portions 56, and links 57 connect the upper extremities of the portions 56 with the upper portions of the bundle receptacle 34. Arms 58 are attached to the side rails 38 of the frame 23 and are provided at their upper ends with rollers 59, against which the curved portions 55 of the flexible members 54 operate as the shaft 32 rotates. The end portions 51 of shafts 48 are located in the paths of movement of the curved portions 55 of the members 54.

As has been heretofore explained, the bundles of grain are delivered to the receptacle 34, and when a sufficient number of bundles has been accumulated therein, the said receptacle 34 is turned with the rotation of the shaft 32, as will be hereinafter explained, and, as the said receptacle turns from an approximately horizontal position to an upright position, the shaft 32 and the said receptacle move in a downward direction caused by the rollers 40 moving along under the guides 37 and pulling the arms 39 down, and thus as the butt ends of the bundles are swung toward the ground, the said bundles are simultaneously lowered, and the shock is positioned upon the ground. At the time that the shaft 32 rotates the end portions 55 of the members 54 move along the peripheries of the rollers 59 supported upon the arms 58; but when the ends of the portions 55 of the members 54 pass below the rollers 59, the tension of the members 54 (which tension has been previously augmented by contact of the portions 55 with the peripheries of the rollers 59) causes the free ends of the portions 55 to fly outwardly, and the said portions 55 of the members 54 come in contact with the sections 51 of the shafts 48, and the said shafts are partially rotated, whereby their catch ends 49 are carried away from the forward end portions of the arms 45. Thus the forward ends of the said arms 45 are rendered free to move in the guides 44, and under the tension of the springs 47, the forward ends of the arms 45 move from the lower ends to the upper ends of the guides 44. When this occurs the rollers 40 carried at the ends of the arms 39 have passed beyond the rear ends of the guides 37 and hence the shaft 32 and its attachments are free, to be raised in the guide 30. This is done by the springs 47 bearing against the arms 45 which at such times bear directly against the shaft 32 as indicated in Fig. 11. As the shaft 32 continues to rotate and the arms 42 are carried around, the rollers 43 mounted upon the said arms 42 come in contact with the inclined portions 46 of the arms 45 and as the said arms 42 continue to rotate about the axis of the shaft 32, the forward ends of the arms 45 are moved down into the lower portions of the guides 44 against the tension of the springs 47 and are thus returned to positions under the catches 49. When the shaft 32 is in elevated position the rollers 40 upon the arms 39 come in contact with the side rails 38 at the forward ends of the guides 37 as most clearly shown in Fig. 9 of the drawing. Thus the arms 39 are approximately vertically under the axis of the shaft 32 and the said arms 39 together with the rollers 40 bearing upon the side rails 38 serve as means for holding the shaft 32 and the parts mounted thereon in elevated position. During the time that the arms 42 pass from positions directly beneath the axis of the shaft 32 and until the arms occupy a similar position and the rollers 40 engage the side rails 38 the shock receptacle 34 is supported in its elevated position by the wire link 41 which engages the shaft 32.

As the members 54 are swung upon their axes as above described by reason of contact between the extremities 55 thereof and the peripheries of the rollers 59 the upper ends of the portions 56 of the said members 54 move toward each other and, through the connecting links 57, the opposite sides of the receptacle 34 are forced toward each other, and thus, as the said receptacle is turning to dumping position, the sides of the same are compressed about the bundles contained therein, but, as soon as the receptacle 34 arrives at a vertical, or an approximately vertical position, the ends of the sections 55 of the members 54 clear the rollers 59 upon the arms 58, and the opposite sides of the receptacle 34 swing away from each other, and consequently the confined bundles are liberated and may be deposited upon the ground in shock form. Inasmuch as the receptacle 34 is made of sheet metal the side portions of the said receptacle possess sufficient resiliency to accomplish the expanding and contracting movement above described. The receptacle 34 is provided with a head 60 (also formed of sheet metal) and the said head 60 is provided at its opposite sides with perforated lugs 61 which receive outwardly disposed fingers 62 mounted upon the sides of the receptacle 34. The said fingers 62 are free to move longitudinally through the perforations in the lugs 61. The head 60 is provided at its upper portion with an inclined section 63, which at its upper edge is provided with a lip 64. Flange portions 65 are formed at the ends of the inclined section 63 and are adapted to have contact with the outer sides of the upper portion of the receptacle 34 when the opposite side portions of the said receptacle swing away from each other. A curved arm 66 is mounted upon the upper portion of the head 60 and is adapted to engage the under side of the section 20 of the trough 19 when the said receptacle 34 swings from receiving to dumping position, and thus, as the said receptacle turns from one position to the other the said section 20 of the trough 19 is swung up out of the way. After the receptacle 34 has moved to dumping position the section 20 of the trough 19 falls to its normal position upon the arm 21, as above described.

Rollers 67 and 68 are journaled upon the outer sides of the receptacle 34, and, at their rear edges project beyond the edge of the said receptacle 34. A movable head 69 is provided for the larger end of the receptacle 34. Said head 69 is provided upon its forward face with brackets 70. A link or shaft 71 is pivotally attached at its ends to the forward rail of the frame 23, and the intermediate portion of the said link or shaft 71 is pivoted in the forward ends of the brackets 70. A link or shaft 72 is journaled at its intermediate portion in the inner portions of the brackets 70, and the lower ends of the said link or shaft 72 are held within vertically disposed guides 73, attached to the side rails 38 of the frame 23.

An arm 74 is fixed to the outer portion of the shaft 32, and is provided at its outer end with a friction roller 75. A lever 76 is fulcrumed in a block 77 which is mounted upon the side rails 38 of the frame 23, and the said lever is provided with a curved extremity 78, which, at times, projects into the path of movement of the roller 75 carried by the arm 74. The upper or forward end of the lever 76 is connected with the lever or link 72 by means of a rod 79. A lug 80 is formed at the upper end of the lever 76 and is adapted to engage the side of the rod 79 when the parts are moved so that the said rod 79 and the lever 76 assume substantial alinement, so that swinging movement on the part of the said lever and rod is limited.

As the shaft 32 rotates and the receptacle 34 is swung from bundle-receiving to shock-dumping position, the rollers 67, carried at the upper forward portion of the said receptacle 34 engage the inner face of the head 69, and the said head is moved away from the end of the receptacle 34, which movement occurs at the ends of the link or shaft 71, which are pivotally attached to the frame 23. As the said head 69 moves away from the receptacle 34 the upper portion of the link 72 is swung in a forward direction, which moves the rod 79 longitudinally and swings the lever 76 in its support 77. Thus the rear end portion 78 of the lever 76 is swung up into the path of movement of the roller 75 carried at the end of the arm 74, which in turn is mounted upon the shaft 32. Therefore, as the said shaft continues to rotate the roller 75 eventually comes in contact with the portion 78 of the shaft 76, and the said shaft, together with its attached parts, are moved back to normal positions, the reverse of those last above described.

The traction wheel 25 is fixed to an axle shaft 81, which in turn is journaled in bearings provided upon the frame of the attachment. A sprocket wheel 82 is fixed to the shaft 81, and a shaft 83 is journaled in a bearing 84, provided upon the frame of the attachment. A sprocket wheel 85 is fixed to the shaft 83, and a sprocket chain 86 passes around the sprocket wheels 82 and 85. A sprocket wheel 87 is journaled upon the shaft 83 and is provided with a clutch hub 88. A clutch member 89 is feathered upon the shaft 83 and is provided with an external groove 90 which receives a ring 91 and to which ring is attached a bail 92. A shaft 93 is journaled upon the frame 23 and is provided with a radially disposed arm 94, which is pivotally connected with the outer portion of the bail 92. The shaft 93 is provided at its rear end with an upstanding strip 95, to the upper end of which is fulcrumed a lever 96. The lever 96 is so connected to the extremity 95 of the shaft 93 that when the long dimension of the lever 96 is in alinement with the long dimension of the said extremity 95 the lever cannot swing toward the traction wheel 25 independently of the said extremity 95 of the shaft 93, but it may swing toward the said traction wheel 25 and carry with it the extremity 95 of the said shaft 93. The said lever 96 however is free to swing in an opposite direction independently of the extremity 95 of the shaft 93. A connecting rod 97 is adjustably and pivotally attached at one end to the upper portion of the lever 96 and at its opposite end the said rod 97 is adjustably and pivotally connected with one end of a rocker 98, which is fulcrumed upon the frame of the attachment. A foot-treadle lever 99 is also fulcrumed upon the frame of the attachment, and a connecting rod 100 is adjustably and pivotally connected at its rear end to that end of the rocker 98 opposite the end thereof with which the rod 97 connects, and the forward end of the rod 100 is pivotally connected with the foot treadle lever 99. An arm 101 is mounted upon the rear rail of the frame 23, and a lever 102 is fulcrumed at the upper end of the arm 101. A connecting rod 103 is pivotally and adjustably attached at its ends with the levers 96 and 102 respectively. A spring 104 is supported by the arm 101 and bears against the lever 102 and is under tension with a tendency to hold that end of the said lever 102 opposite the end thereof with which the rod 103 attaches toward the traction wheel 25. A catch 105 is pivoted to the working end of the lever 102 and is provided with a notch 106, which is adapted to receive the lip 64 formed at the upper edge of the head 60 of the receptacle 34. A spring 107 is attached to the lever 102 and bears against the catch 105, and is under tension with a tendency to hold the lower or free portion of the catch 105 in the path of movement of the lip 64. A sprocket wheel 108 is fixed to the inner end of the shaft 32, and a sprocket chain 109 passes around the sprocket wheels 87 and 108.

A ratchet wheel 110 is fixed to the shaft 81, and upon a bar 111 of the frame 23 is located a plate 112, disposed tangentially with relation to a circle struck from the center of the ratchet wheel 110 and a curved plate 113 which is substantially concentric with the center of the ratchet wheel 110. The plate 113 is slightly spaced from the outer ends of the ratchets provided upon the wheel 110. The forward end of the shaft 93 is non-circular as at 114, and a bar 115 is provided with a head 116 having a non-circular opening which snugly receives the non-circular portion 114 of the shaft 93. The said bar 115 is free to slide upon the shaft 93, but is retained against independent lateral swinging movement by reason of the non-circular configuration of the end portion 114 of the shaft and the opening in the head 116. A coil spring 117 is interposed between a collar 118 mounted upon the shaft 93, and the enlarged head 116 of the arm 115. The spring 117 is under tension with a tendency to hold the head 116 of the arm 115 toward the collar 118. A lever 119 is fulcrumed to the frame 23 and is provided with a hooked extremity 120, which lies behind the outer portion of the arm 115 and loosely receives the same. The opposite or upper end of the lever 119 lies in the path of movement of an arm 121 which is fixed to the shaft 32. When a sufficient number of bundles have been accumulated in the receptacle 34 the operator places his foot upon the foot-treadle 99 and swings the same, which moves the rod 100 longitudinally and swings the rocker 98 upon its axis. This movement on the part of the said rocker moves the rod 97 longitudinally, and, through the lever 96, the shaft 93 is turned upon its axis and the arm 94 is moved toward the adjacent end of the shaft 83. This movement on the part of the arm 94, and through the bail 92 and ring 91, the clutch member 89 is moved into engagement with the clutch hub 88 of the sprocket wheel 87. As the machine moves over the surface of the ground rotary movement is transmitted from the axle 81 through the sprocket wheels 82 and 85 and chain 86 to the shaft 83, and when the clutch member 89 is moved into engagement with the clutch hub 88 rotary movement is transmitted from the said shaft 83 to the shaft 32. By rotating the shaft 32 the contents of the receptacle are deposited upon the ground as above described. At the same time that the lever 96 is swung the lever 102 is swung correspondingly through the connecting rod 103, and thus the catch 105 carried by the lever 102 is moved out of engagement with the lip 64 carried by the head 60 of the receptacle 34. As the arm 121 rotates about the axis of the shaft 32 the said arm comes in contact with the upper end of the lever 119 and the said lever is swung upon its fulcrum upon the side rail 38, and the arm 115 is moved bodily upon the shaft 93 away from the collar 118 and against the tension of the spring 117 which tends to hold the arm 115 toward the collar 118.

As the arm 115 is moved along the shaft 93 the inner end of the said arm is brought in contact with one of the ratchets at the periphery of the wheel 110, and the inner end of the arm 115 is carried up along the under side of the plate 113. When the inner end of the arm 115 arrives at the plate 112 the said arm 115 has partially rotated the shaft 93 in the opposite direction from that in which it is turned when the operator presses the foot-treadle 99. Thus, when the inner end of the arm 115 arrives at the plate 112 the said shaft 93 has been turned to such an extent as to disengage, through its connections, the clutch member 89 from the clutch hub 88 of the sprocket wheel 87. By reason of the fact that the arm 121 carried by the shaft 32 does not engage the upper end of the lever 119 until the said shaft 32 has about completed one revolution, the clutch member 89 is not disengaged from the clutch hub 88 of the sprocket wheel 87 until the said shaft 32 has completed its revolution, and the shock has been positioned upon the ground. At the same time that the shaft 93 is turned back to its original or normal position by the arm 115 the lever 102 is swung upon its fulcrum through the connecting rod 103, and the catch 105 carried by the said lever is swung into the path of movement of the lip 64, so that when the receptacle 34 assumes its normal or bundle-receiving position the said lip 64 enters the notch 106 provided in the catch 105, and the parts are temporarily locked. After the inner end of the arm 115 arrives at the plate 112 it remains in the vicinity of the said plate until the shaft 93 is again partially rotated by the operator depressing the foot-lever 99. When this is done the inner end of the arm 115 slides down along the outer surface of the plate 113, and is in position at the lower end portion of the said plate 113 when it is again moved in contact with the ratchet carried by the wheel 110, as above described.

Having described my invention, what I claim as new, and desire to secure, by Letters Patent, is:—

1. In a grain shocker, a receptacle mounted for rotary movement and simultaneous vertical reciprocatory movement, and means for contracting the sides of the receptacle during the downward vertical movement thereof.

2. A shocker comprising a receptacle mounted for rotation upon an axis, and movable vertically, a bundle-receiving trough located above the receptacle and having a hinged side, and means for delivering bundles successively from the grain deck of a harvester to the said bundle-receiving trough.

3. A shocker comprising a receptacle mounted for rotation about an axis, and movable vertically, means for contracting and spreading the walls of the receptacle as the said receptacle rotates, and a trough located above the receptacle and having a hinged side, and means for delivering bundles successively to the said trough.

4. A shocker comprising a shaft journaled for rotation and having a crank portion, a receptacle located in the crank portion of the shaft, means for rotating the shaft, and moving the same vertically, and a locking means for holding the said receptacle in bundle-receiving position.

5. A shocker comprising a frame having uprights with elongated openings, a shaft journaled for rotation in the openings, means for rotating the shaft, means for moving the said shaft along the openings at the same time that it is rotated, said shaft having an intermediate crank portion, a bundle receptacle located in said crank portion and having an open delivery end, means for locking the said bundle receptacle in bundle-receiving position, means for closing the delivery end of said bundle receptacle consisting of a movable head, and means for moving the said head relative to the receptacle as the receptacle is rotated.

6. A shocker comprising a frame having arms located thereon and provided with elongated openings, a shaft having an intermediate crank portion, said shaft being journaled in the openings of the arms, means for rotating said shaft, means for moving the shaft along the openings in the arms at the time that it is rotated, a bundle receptacle located upon the shaft and having an open delivery end, means for contracting and spreading the sides of the bundle receptacle at the same time that it is rotated, a catch means for holding the receptacle in bundle-receiving position, means for removing the said catch means from engagement with the bundle receptacle, a movable head for closing the delivery end of the bundle receptacle, and means for moving the said head relative to the receptacle as the said receptacle rotates.

In testimony that I claim the foregoing as my own, I have hereto affixed my signature in the presence of two witnesses.

JULIUS FRITZ.

Witnesses:
A. WRIGHT,
P. O. HOWELL.

Copies of this patent may be obtained for five cents each, by addressing the " Commissioner of Patents, Washington, D. C."